United States Patent
Lee et al.

(10) Patent No.: US 9,780,370 B2
(45) Date of Patent: Oct. 3, 2017

(54) LITHIUM MANGANESE-BASED OXIDE AND CATHODE ACTIVE MATERIAL INCLUDING THE SAME

(71) Applicant: LG Chem, Ltd., Seoul (KR)

(72) Inventors: Bo Ram Lee, Daejeon (KR); Hye Lim Jeon, Daejeon (KR); Sun Sik Shin, Daejeon (KR); Sang Wook Lee, Daejeon (KR); Wang Mo Jung, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/770,170

(22) PCT Filed: Apr. 8, 2014

(86) PCT No.: PCT/KR2014/003030
§ 371 (c)(1),
(2) Date: Aug. 25, 2015

(87) PCT Pub. No.: WO2015/012473
PCT Pub. Date: Jan. 29, 2015

(65) Prior Publication Data
US 2016/0141619 A1    May 19, 2016

(30) Foreign Application Priority Data
Jul. 24, 2013 (KR) .................. 10-2013-0087154

(51) Int. Cl.
*H01M 4/505* (2010.01)
*C01G 53/00* (2006.01)
(Continued)

(52) U.S. Cl.
CPC ............ *H01M 4/505* (2013.01); *C01G 53/56* (2013.01); *H01M 10/0525* (2013.01);
(Continued)

(58) Field of Classification Search
CPC ............ H01M 4/505; H01M 10/0525; H01M 10/052; H01M 2220/20; H01M 2220/30
See application file for complete search history.

(56) References Cited

U.S. PATENT DOCUMENTS

2002/0022183 A1  2/2002  Ogawa et al.
2008/0268347 A1  10/2008  Ohzuku et al.
(Continued)

FOREIGN PATENT DOCUMENTS

CN  101694876 A  4/2010
CN  102447103 A  5/2012
(Continued)

OTHER PUBLICATIONS

Singh, Gurpreet, et al., "Electrochemical Behavior of Cr-Doped Composite $Li_2MnO_3$—$LiMn_{0.5}Ni_{0.5}O_2$," Cathode Materials, Journal of the Electrochemical Society, vol. 159, issue 4, 2002, A410-A420.

(Continued)

*Primary Examiner* — Jane Rhee
(74) *Attorney, Agent, or Firm* — Lerner, David, Littenberg, Krumholz & Mentlik, LLP

(57) ABSTRACT

Disclosed is a lithium manganese (Mn)-based oxide including Mn as an essential transition metal and having a layered crystal structure, in which the amount of Mn is greater than that of other transition metal(s), the lithium manganese-based oxide exhibits flat level section characteristics in which release of oxygen occurs together with lithium deintercalation during first charging in a high voltage range of 4.4 V or higher, and at least one of a transition metal layer including Mn and an oxygen layer is substituted or doped with a pillar element.

18 Claims, 2 Drawing Sheets

(51) Int. Cl.
*H01M 10/0525* (2010.01)
*H01M 10/052* (2010.01)

(52) U.S. Cl.
CPC ...... *C01P 2002/32* (2013.01); *C01P 2006/40* (2013.01); *H01M 10/052* (2013.01); *H01M 2220/20* (2013.01); *H01M 2220/30* (2013.01); *Y02E 60/122* (2013.01)

(56) References Cited

U.S. PATENT DOCUMENTS

| | | | |
|---|---|---|---|
| 2011/0311869 A1 | 12/2011 | Oh et al. | |
| 2012/0217452 A1* | 8/2012 | Park | H01B 1/08 252/506 |
| 2012/0244334 A1 | 9/2012 | Park et al. | |
| 2013/0224585 A1 | 8/2013 | Oh et al. | |
| 2013/0228718 A1 | 9/2013 | Lee et al. | |

FOREIGN PATENT DOCUMENTS

| | | |
|---|---|---|
| CN | 102646831 A | 8/2012 |
| CN | 103022465 A | 4/2013 |
| JP | 2002063903 A | 2/2002 |
| JP | 2002313337 A | 10/2002 |
| JP | 2005190900 A | 7/2005 |
| JP | 2008258160 A | 10/2008 |
| JP | 2012041257 A | 3/2012 |
| JP | 2012216549 A | 11/2012 |
| JP | 2013520782 A | 6/2013 |
| KR | 20020065191 A | 8/2002 |
| KR | 20130024595 A | 3/2013 |
| KR | 20130031079 A | 3/2013 |
| TW | 201230468 A | 7/2012 |
| WO | 2013085317 A1 | 6/2013 |

OTHER PUBLICATIONS

Lian, et al., "Fe-doping effects ont he structural and electrochemical properties of $0.5Li_2MnO_3$—$0.5LiMn_{0.5}Ni_{0.5}O_2$ electrode material." Journal of Applied Electrochemistry, Jun. 2012, vol. 42, Issue 6, pp. 409-417.

Li, et al., "Fe Content Effects on Electrochemical Properties of $0.3Li_2MnO_3$—$0.7LiMn_xNi_xFe_{(1-2x)/2}$ $O_2$ Cathode Materials." Advanced Materials Research, vols. 347-353, pp. 3518-3521, 2012.

International Search Report for Application No. PCT/KR2014/003030 dated Jul. 15, 2014.

Thackeray, Michael M. et al., $Li_2MnO_3$-stabilized $LiMO_2$ (M=Mn, Ni, Co) electrodes for lithium-ion batteries, Journal of Materials Chemistry, 2007, vol. 17, pp. 3112-3125. Abstract; pp. 3113-3115.

* cited by examiner

[FIG. 1]
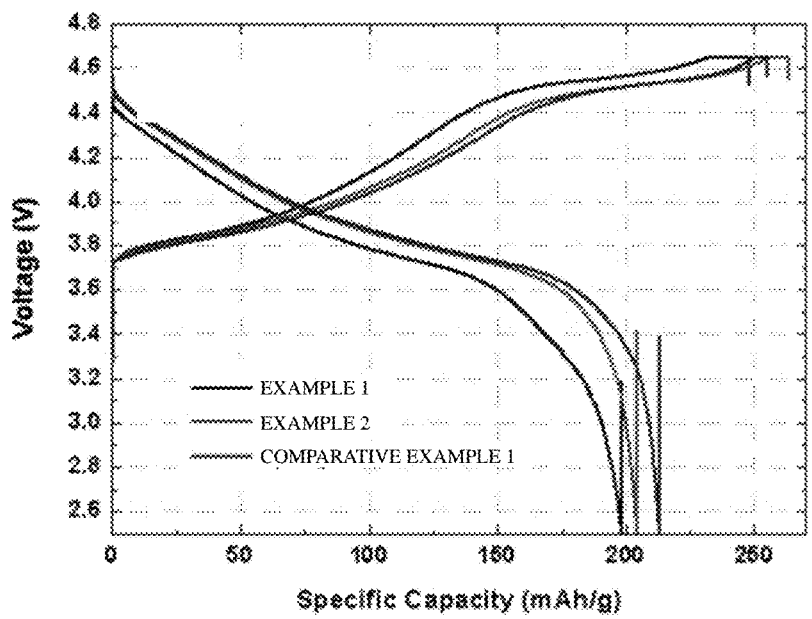
[FIG. 2]
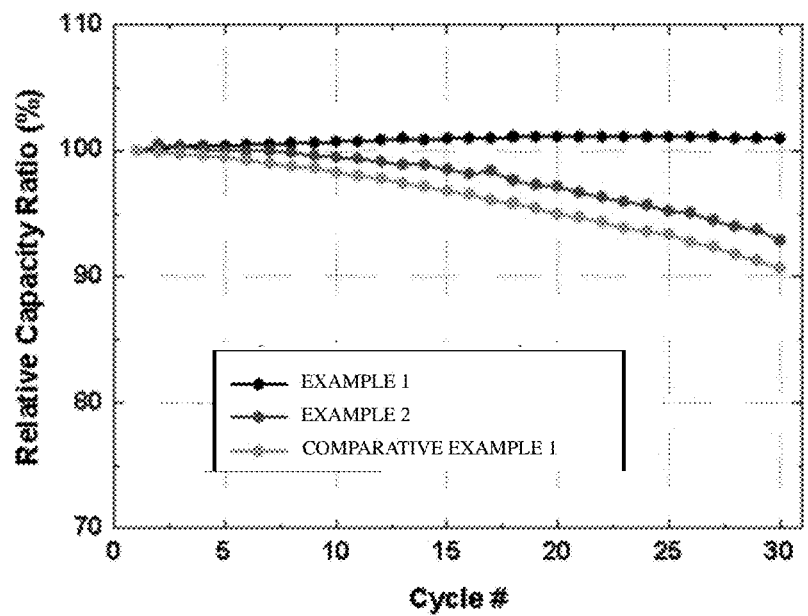

[FIG. 3]
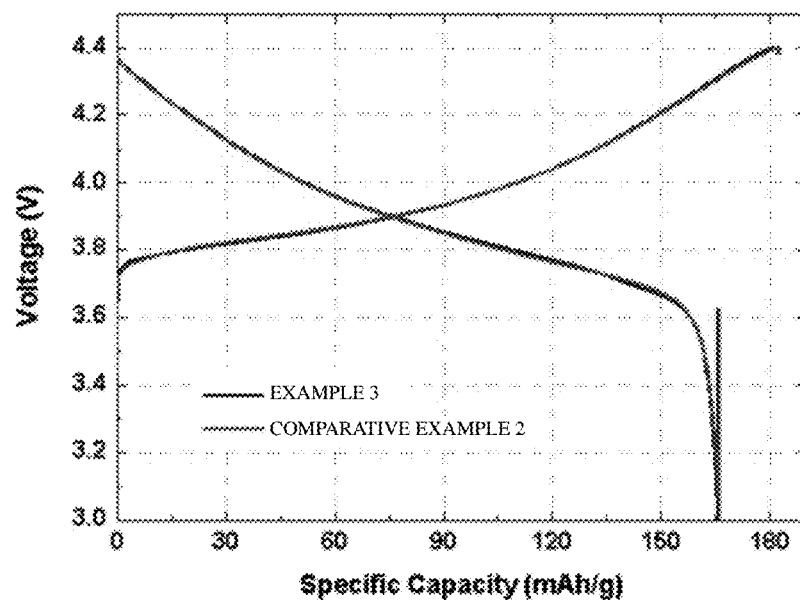
[FIG. 4]
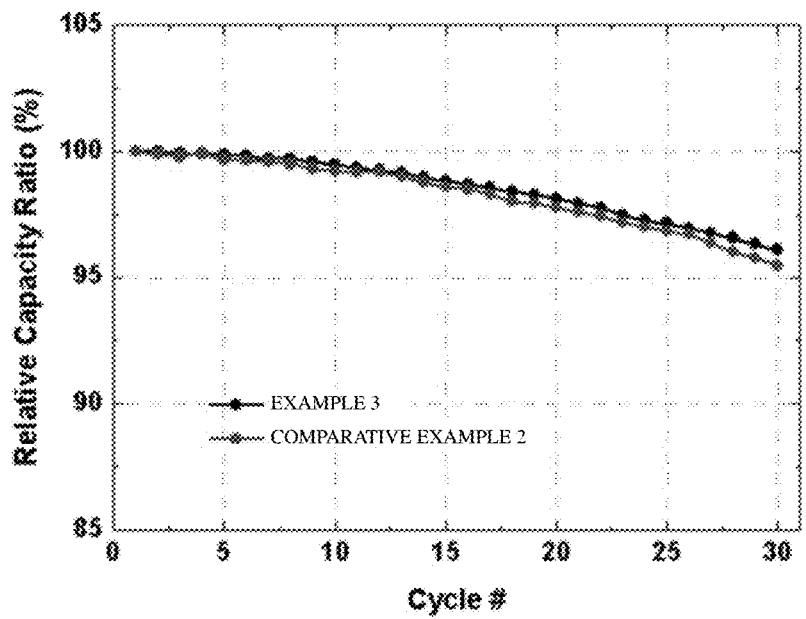

LITHIUM MANGANESE-BASED OXIDE AND CATHODE ACTIVE MATERIAL INCLUDING THE SAME

CROSS REFERENCE TO RELATED APPLICATIONS

The present application is a national phase entry under 35 U.S.C. §371 of International Application No. PCT/KR2014/003030, filed Apr. 8, 2014, which claims priority to Korean Patent Application No. 10-2013-0087154, filed Jul. 24, 2013, the disclosures of which are incorporated herein by reference.

TECHNICAL FIELD

The present invention relates to a lithium manganese-based oxide and a cathode active material including the same and, more particularly, to a lithium manganese (Mn)-based oxide including Mn as an essential transition metal and having a layered crystal structure, in which the amount of Mn is greater than that of other transition metal(s), the lithium manganese-based oxide exhibits flat level section characteristics in which release of oxygen occurs together with lithium deintercalation during first charging in a high voltage range of 4.4 V or higher, and a transition metal layer including Mn and/or an oxygen layer are substituted or doped with a pillar element.

BACKGROUND ART

As mobile device technology continues to develop and demand therefor continues to increase, demand for secondary batteries as energy sources is rapidly increasing. Among these secondary batteries, lithium secondary batteries, which exhibit high energy density and operating potential, have long cycle lifespan, and have a low self-discharge rate, are commercially available and widely used.

In addition, as interest in environmental problems is increasing, research into electric vehicles and hybrid electric vehicles that can replace vehicles using fossil fuels, such as gasoline vehicles, diesel vehicles, and the like, which are one of the main causes of air pollution, is actively underway. As a power source of electric vehicles, hybrid electric vehicles, and the like, a nickel metal-hydride secondary battery is mainly used. However, research into lithium secondary batteries having high energy density and high discharge voltage is actively underway and some lithium secondary batteries are commercially available.

In a lithium ion secondary battery used in conventional small batteries, generally, a cathode is formed of a lithium cobalt composite oxide having a layered structure and an anode is formed of a graphite-based material. However, a lithium cobalt composite oxide is unsuitable for use in batteries for electric vehicles because Co, which is a main component of the lithium cobalt composite oxide, is very expensive and the lithium cobalt composite oxide is not safe. Thus, lithium manganese composite oxides, which are inexpensive, have high safety, consist of Mn, and have a spinel structure, may be suitable for use in a cathode of lithium ion batteries for electric vehicles.

In general, spinel-structure lithium manganese-based oxides have high thermal safety, are inexpensive, and are easy to synthesize, while having low capacity, deteriorated lifespan characteristics due to side reaction, poor high-temperature characteristics, and low conductivity.

To address these problems, use of lithium manganese composite oxides having a spinel structure, some metal elements of which are substituted, has been tried. For example, Korean Patent Application Publication No. 2002-65191 discloses a spinel-structured lithium manganese composite oxide with high thermal safety. However, a battery including the lithium manganese composite oxide exhibits low capacity and deteriorated high-temperature storage characteristics and cycle lifespan.

To complement the low capacity problems of spinel and secure excellent thermal stability of manganese-based active materials, use of lithium manganese composite oxides having a layered structure has been tried. However, such lithium manganese composite oxides have an unstable structure, undergo phase transition during charge and discharge, and exhibit rapidly reduced capacity and deteriorated lifespan characteristics.

In addition, when such lithium manganese composite oxides are stored at high temperature, Mn is eluted to an electrolyte by the impact of the electrolyte and thus battery characteristics are deteriorated and therefore there is a need to develop improvements to address these problems. In addition, such lithium manganese composite oxides have lower capacity per unit weight than existing lithium cobalt composite oxides or conventional lithium nickel composite oxides and thus there are limitations in increasing capacity per unit battery weight. Thus, batteries that address these problems need to be designed to enable practical use thereof as a power source of electric vehicles.

Therefore, there is an urgent need to develop technology for enhancing structural stability of a cathode active material at high voltage without deterioration of battery characteristics.

DISCLOSURE

Technical Problem

Therefore, the present invention has been made to solve the above problems and other technical problems that have yet to be resolved.

That is, it is an object of the present invention to provide a lithium manganese (Mn)-based oxide in which a transition metal layer, an oxygen layer, or the like is substituted or doped with a pillar element and thus problems due to collapse of a layered structure, such as elution of Mn to a surface of the cathode active material during battery charge and discharge and the like, are addressed, whereby safety and lifespan characteristics of a battery including the cathode active material may be enhanced.

Technical Solution

In accordance with one aspect of the present invention, provided is a lithium manganese (Mn)-based oxide as a cathode active material that includes Mn as an essential transition metal and has a layered crystal structure, in which the amount of Mn is greater than that of other transition metal(s), the lithium manganese-based oxide exhibits flat level section characteristics in which release of oxygen occurs together with lithium deintercalation during first charging in a high voltage range of 4.4 V or higher, and a transition metal layer including Mn and/or an oxygen layer are substituted or doped with a pillar element.

In general, when lithium manganese-based oxides including Mn in an amount of 50 mol % based on a total amount of transition metals are used, high capacity may be obtained only with charging to at least 4.4 V. In particular, such lithium manganese-based oxides have flat level section characteristics in which release of oxygen occurs together with lithium deintercalation during first charging in a high voltage range of 4.4 V or higher and thus undergo phase transition during charging and discharging due to unstable structure thereof and exhibit rapidly reduced capacity and deteriorated lifespan characteristics.

By contrast, in the lithium manganese-based oxide according to the present invention, interlayer interaction of the cathode active material occurs by the substituted or doped pillar element present in the transition metal layer, the oxygen layer, or the like and thus structural collapse thereof during charging and discharging is prevented, which enables resolution of problems such as deterioration of battery characteristics due to elution of Mn to an electrolyte by the impact of the electrolyte when existing cathode active materials are stored at high temperature.

In a specific embodiment, the lithium manganese-based oxide may be a compound represented by Formula 1 below:

$$x\text{Li}_2\text{MnO}_3 \cdot (1-x)\text{LiMO}_2 \quad (1)$$

wherein $0 < x < 1$;

M is at least one element selected from the group consisting of nickel (Ni), cobalt (Co), and manganese (Mn).

The pillar element may, for example, be at least one selected from the group consisting of vanadium (V), sodium (Na), iron (Fe), barium (Ba), strontium (Sr), zirconium (Zr), and calcium (Ca).

The lithium manganese-based oxide according to the present invention may be prepared by dry-mixing a lithium compound as a lithium source, a transition metal precursor as a source of a transition metal such as Mn or the like, and a pillar element-containing compound as a doping element source in a predetermined amount ratio and heat-treating the resulting mixture.

The heat treatment process may be performed in air at 800° C. to 1000° C., and the amount of the pillar element may be 0.02 mol % to 0.1 mol % based on a total amount of the lithium manganese-based oxide.

The present invention also provides a cathode mixture for secondary batteries that includes the cathode active material described above and a cathode for secondary batteries that is coated with the cathode mixture.

The cathode mixture may further selectively include a conductive material, a binder, a filler, and the like, in addition to the cathode active material.

The conductive material is typically added in an amount of 1 to 30 wt % based on the total weight of the mixture including the cathode active material. There is no particular limit as to the conductive material, so long as it does not cause chemical changes in the fabricated battery and has conductivity. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an active material and the conductive material and in binding of the active material to a current collector. The binder is typically added in an amount of 1 to 30 wt % based on the total weight of the mixture including the cathode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit cathode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The cathode according to the present invention may be manufactured by coating, on a cathode current collector, a slurry prepared by mixing a cathode mixture including the compounds described above with a solvent such as NMP or the like and drying and rolling the coated cathode current collector.

The cathode current collector is generally fabricated to a thickness of 3 to 500 μm. The cathode current collector is not particularly limited so long as it does not cause chemical changes in the fabricated lithium secondary battery and has conductivity. For example, the cathode current collector may be made of stainless steel, aluminum, nickel, titanium, sintered carbon, aluminum or stainless steel surface-treated with carbon, nickel, titanium, or silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The present invention also provides a lithium secondary battery including the cathode, an anode, a separator, and a lithium salt-containing non-aqueous electrolyte.

The anode may be manufactured by, for example, coating an anode mixture including an anode active material on an anode current collector and drying the coated anode current collector. As desired, the anode mixture may further include the above-described components.

Examples of the anode active material include carbon such as hard carbon and graphite-based carbon; metal composite oxides such as $\text{Li}_x\text{Fe}_2\text{O}_3$ where $0 \le x \le 1$, $\text{Li}_x\text{WO}_2$ where $0 \le x \le 1$, $\text{Sn}_x\text{Me}_{1-x}\text{Me}'_y\text{O}_z$ where Me: Mn, Fe, Pb, or Ge; Me': Al, B, P, Si, Groups I, II and III elements, or halogens; $0 < x \le 1$; $1 \le y \le 3$; and $1 \le z \le 8$; lithium metals; lithium alloys; silicon-based alloys; tin-based alloys; metal oxides such as SnO, $\text{SnO}_2$, PbO, $\text{PbO}_2$, $\text{Pb}_2\text{O}_3$, $\text{Pb}_3\text{O}_4$, $\text{Sb}_2\text{O}_3$, $\text{Sb}_2\text{O}_4$, $\text{Sb}_2\text{O}_5$, GeO, $\text{GeO}_2$, $\text{Bi}_2\text{O}_3$, $\text{Bi}_2\text{O}_4$, and $\text{Bi}_2\text{O}_5$; conductive polymers such as polyacetylene; and Li—Co—Ni-based materials.

The anode current collector is typically fabricated to a thickness of 3 to 500 μm. The anode current collector is not particularly limited so long as it does not cause chemical changes in the fabricated battery and has high conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. Similar to the cathode current collector, the anode current collector may also have fine irregularities at a surface thereof to enhance adhesion between the anode current collector and the anode active material and be used in various forms including films, sheets, foils, nets, porous structures, foams, and non-woven fabrics.

The separator is disposed between the cathode and the anode and, as the separator, a thin insulating film with high ion permeability and high mechanical strength is used. The separator generally has a pore diameter of 0.01 to 10 μm and a thickness of 5 to 300 μm. As the separator, for example, sheets or non-woven fabrics, made of an olefin polymer such as polypropylene; or glass fibers or polyethylene, which have chemical resistance and hydrophobicity, are used. When a solid electrolyte such as a polymer or the like is used as an electrolyte, the solid electrolyte may also serve as a separator.

The lithium salt-containing non-aqueous electrolyte consists of an electrolyte and a lithium salt. The electrolyte may be a non-aqueous organic solvent, an organic solid electrolyte, an inorganic solid electrolyte, or the like.

Examples of the non-aqueous organic solvent include non-protic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include, without being limited to, nitrides, halides and sulfates of lithium (Li) such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the non-aqueous electrolyte and examples thereof include, without being limited to, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the electrolyte. If necessary, in order to impart incombustibility, the electrolyte may further include halogen-containing solvents such as carbon tetrachloride and ethylene trifluoride. Further, in order to improve high-temperature storage characteristics, the non-aqueous electrolyte may further include carbon dioxide gas, fluoro-ethylene carbonate (FEC), propene sultone (PRS), fluoro-propylene carbonate (FPC), or the like.

The secondary battery according to the present invention may be used in a battery cell used as a power source of small devices and may also be used as a unit cell of a medium and large-scale battery module including a plurality of battery cells.

The present invention also provides a battery pack including the battery module as a power source of a medium and large-scale device. Examples of the medium and large-scale device include, but are not limited to, electric vehicles (EVs), hybrid EVs (HEVs), and plug-in HEVs (PHEVs); and devices for storing power.

Effects of the Invention

As described above, in a lithium manganese-based oxide included in a cathode active material according to the present invention, a transition metal layer, an oxygen layer, or the like is substituted or doped with a pillar element and thus problems due to collapse of a layered structure, such as elution of Mn to a surface of the cathode active material during battery charge and discharge and the like, are addressed, whereby safety and lifespan characteristics of a battery including the cathode active material may be enhanced.

BRIEF DESCRIPTION OF THE DRAWINGS

The above and other objects, features and other advantages of the present invention will be more clearly understood from the following detailed description taken in conjunction with the accompanying drawing, in which:

FIG. 1 is a graph showing initial discharge capacities according to Experimental Example 1;

FIG. 2 is a graph showing lifespan characteristics according to Experimental Example 2;

FIG. 3 is a graph showing initial discharge capacities according to Experimental Example 3; and FIG. 4 is a graph showing lifespan characteristics according to Experimental Example 4.

BEST MODE

Now, the present invention will be described in more detail with reference to the following examples. These examples are provided only for illustration of the present invention and should not be construed as limiting the scope and spirit of the present invention.

Example 1

In a process of preparing $0.25Li_2MnO_3 \cdot 0.75(Mn_{0.47}Ni_{0.53})O_2$ as a lithium manganese (Mn)-based oxide including Mn as an essential transition metal and having a layered crystal structure, 0.05 mol % of $NaCO_3$ was added as a pillar material in the form of an oxide and the resulting mixture was sintered in air at a temperature of 800° C. for 5 hours, thereby completing preparation of a cathode active material in which at least one of a transition metal layer and an oxygen layer was substituted or doped with Na as a pillar element.

The cathode active material, a conductive agent, and a binder were used in a ratio of 88:6.5:5.5 to prepare a slurry and the slurry was coated onto an Al-foil having a thickness of 20 μm to manufacture a cathode. The cathode, Li-metal as an anode, and an electrolyte containing 1M $LiPF_6$ in a mixed solvent of EC:EMC (1:2) to which 2 wt % of $LiBF_4$ was added were used to manufacture a coin cell.

Example 2

A cathode and a coin cell were manufactured in the same manner as in Example 1, except that the sintering process was performed at 950° C.

Example 3

In a process of preparing 0.15Li$_2$MnO$_3$·0.85(Mn$_{0.47}$Ni$_{0.47}$Co$_{0.12}$)O$_2$ as a lithium manganese (Mn)-based oxide including Mn as an essential transition metal and having a layered crystal structure, 0.02 mol % of ZrO$_2$ was added as a pillar material in the form of an oxide and the resulting mixture was sintered in air at 950° C. for 5 hours, thereby completing preparation of a cathode active material in which at least one of a transition metal layer and an oxygen layer was substituted or doped with Zr as a pillar element.

The cathode active material, a conductive agent, and a binder were used in a ratio of 88:6.5:5.5 to prepare a slurry and the slurry was coated onto an Al-foil having a thickness of 20 μm to manufacture a cathode. The cathode, Li-metal as an anode, and an electrolyte containing 1M LiPF$_6$ in a mixed solvent of EC:(DMC+EMC) (1:2) to which 2 wt % of LiBF$_4$ was added were used to manufacture a coin cell.

Comparative Example 1

A cathode and a coin cell were manufactured in the same manner as in Example 2, except that the pillar material was not added in the process of preparing the lithium manganese composite oxide of Example 2.

Comparative Example 2

A cathode and a coin cell were manufactured in the same manner as in Example 3, except that the pillar material was not added in the process of preparing the lithium manganese composite oxide of Example 3.

Experimental Example 1

Discharge capacities of the cells manufactured according to Examples 1 and 2 and Comparative Example 1 were measured by performing an initial cycle under the following conditions: voltage of 2.5 V to 4.65 V and current of 0.1 C rate and results are shown in Table 1 below and FIG. 1.

TABLE 1

|  | Example 1 | Example 2 | Comparative Example 1 |
|---|---|---|---|
| 1$^{st}$ discharge capacity | 198 mAh/g | 204 mAh/g | 213 mAh/g |

Experimental Example 2

An experiment for lifespan characteristics of the cells of Examples 1 and 2 and Comparative Example 1 was implemented under the following conditions: voltage of 3.0 V to 4.4. V and current of 0.5 C rate. In this regard, the lifespan characteristics were evaluated as retention rate with respect to initial capacity after 30 cycles and results are shown in Table 2 below and FIG. 2.

TABLE 2

|  | Example 1 | Example 2 | Comparative Example 1 |
|---|---|---|---|
| Lifespan characteristics | 101% | 93% | 91% |

Experimental Example 3

Discharge capacities of the cells of Example 3 and Comparative Example 2 were measured by performing an initial cycle under the following conditions: voltage of 3.0 V to 4.4. V and current of 0.1 C rate. Results are shown in Table 3 below and FIG. 4.

TABLE 3

|  | Example 3 | Comparative Example 2 |
|---|---|---|
| 1$^{st}$ discharge capacity | 165 mAh/g | 167 mAh/g |

Experimental Example 4

An experiment for lifespan characteristics of the cells of Example 3 and Comparative Example 2 was implemented under the following conditions: voltage of 3.0 V to 4.4. V and current of 0.5 C rate. In this regard, the lifespan characteristics were evaluated as retention rate with respect to initial capacity after 30 cycles and results are shown in Table 4 below and FIG. 4.

TABLE 4

|  | Example 3 | Comparative Example 2 |
|---|---|---|
| Lifespan characteristics | 95% | 96% |

According to the results shown in Tables 1 to 4 and FIGS. 1 to 4, it can be confirmed that, although the cells of Examples 1 to 3 exhibit a reduction in initial capacity due to the pillar material added in the process of preparing the cathode active material, the cells of Examples 1 to 3 exhibit superior lifespan and capacity characteristics to the cells of Comparative Examples 1 and 2.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A lithium manganese (Mn)-based oxide comprising Mn as an essential transition metal and having a layered crystal structure,
   wherein an amount of Mn is greater than that of other transition metal(s),
   the lithium manganese-based oxide exhibits flat level section characteristics in which release of oxygen occurs together with lithium deintercalation during first charging in a high voltage range of 4.4 V or higher,
   wherein the lithium manganese-based oxide has a layered structure comprising at least one transition metal layer including Mn and at least one oxygen layer and is represented by Formula 1 below:

wherein 0<x<1; and
   M is at least one element selected from the group consisting of nickel (Ni), cobalt (Co), and Mn
   wherein the at least one transition metal layer including Mn and/or the at least one oxygen layer is substituted or doped with a pillar element; and the pillar element is at least one selected from the group consisting of vanadium (V), sodium (Na), iron (Fe), barium (Ba), strontium (Sr), zirconium (Zr), and calcium (Ca).

2. The lithium manganese-based oxide according to claim 1, wherein an amount of the pillar element is 0.02 mol % to 0.1 mol % based on a total amount of the lithium manganese-based oxide.

3. The lithium manganese-based oxide according to claim 1, wherein an amount of Mn is 50 mol % or more based on a total amount of the transition metals.

4. The lithium manganese-based oxide according to claim 1, wherein the lithium manganese-based oxide is prepared by dry-mixing a compound comprising the pillar element with a transition metal precursor and a lithium precursor and heat-treating the mixture.

5. The lithium manganese-based oxide according to claim 4, wherein the heat-treating is performed at a temperature of 800° C. to 1000° C.

6. The lithium manganese-based oxide according to claim 4, wherein the heat-treating is performed in air.

7. A cathode active material for secondary batteries, comprising the lithium manganese-based oxide according to claim 1.

8. A cathode mixture for secondary batteries, comprising the cathode active material according to claim 7.

9. A cathode for secondary batteries, in which the cathode mixture according to claim 8 is coated on a current collector.

10. A lithium secondary battery comprising the cathode according to claim 9.

11. A battery module comprising the lithium secondary battery according to claim 10 as a unit cell.

12. A battery pack comprising the battery module according to claim 11.

13. A device using the battery pack according to claim 12 as a power source.

14. A cathode active material for secondary batteries, comprising the lithium manganese-based oxide according to claim 2.

15. A cathode active material for secondary batteries, comprising the lithium manganese-based oxide according to claim 3.

16. A cathode active material for secondary batteries, comprising the lithium manganese-based oxide according to claim 4.

17. A cathode active material for secondary batteries, comprising the lithium manganese-based oxide according to claim 5.

18. A cathode active material for secondary batteries, comprising the lithium manganese-based oxide according to claim 6.

* * * * *